June 3, 1969            A. WINKLER            3,447,435
CAMERA WITH FLASH UNIT
Filed Sept. 12, 1966
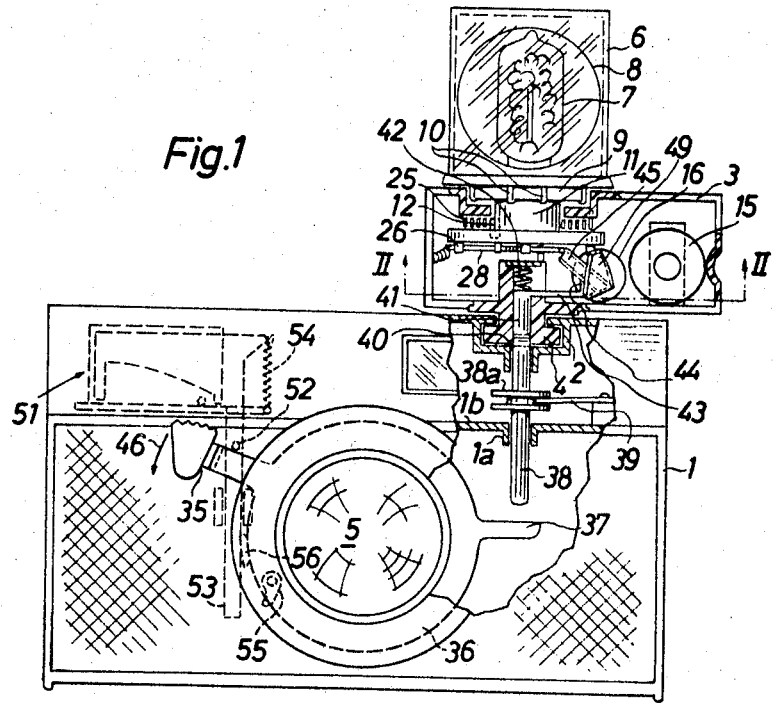
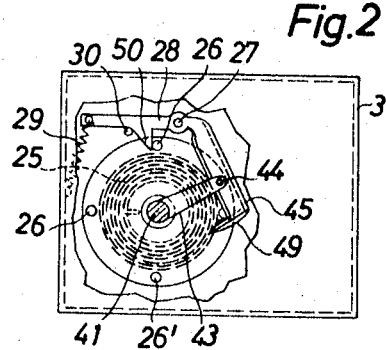
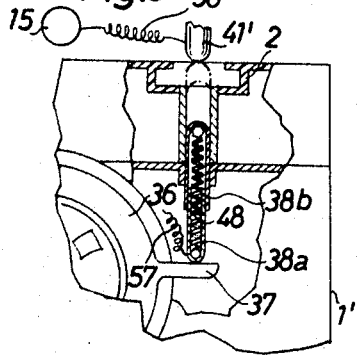
INVENTOR.
ALFRED WINKLER
BY
Michael S. Striker

United States Patent Office 3,447,435
Patented June 3, 1969

3,447,435
CAMERA WITH FLASH UNIT
Alfred Winkler, Munich, Germany, assignor to Agfa-Gevaert Aktiengesellschaft, Leverkusen, Germany
Filed Sept. 12, 1966, Ser. No. 578,679
Claims priority, application Germany, Sept. 18, 1965, A 24,402
Int. Cl. C03b 9/70, 15/02; F21v 19/04
U.S. Cl. 95—11.5        15 Claims

ABSTRACT OF THE DISCLOSURE

The casing of a flash unit has a foot which is insertable into the accessory shoe on the housing of a photographic camera. The casing accommodates an indexible socket for multiple flash bulb holders and an indexing mechanism for the socket. The camera has a motion transmitting member which is moved in response to operation of the camera actuating means into operative engagement with a second motion transmitting member mounted in the casing. The second motion transmitting member, when engaged by the first transmitting member, releases a catch to operate the indexing mechanism.

---

The present invention relates to photographic cameras with flash units. More particularly, the invention relates to improvements in photographic cameras with detachable flash units of the type utilizing "Flashcubes" or analogous multiple flash bulb holders. Still more particularly, the invention relates to improvements in photographic cameras with detachable flash units wherein the flash unit accommodates an indexing mechanism for the multiple flash bulb holder.

It is an important object of my invention to provide a very simple system for actuating the indexing mechanism for multiple flash bulb holders.

Another object of the invention is to provide a camera wherein the operation of the indexing mechanism is incidental to other essential operation or operations which must be carried out in the course of making an exposure.

A further object of the invention is to provide a camera with automatic exposure control wherein the selection of one or more exposure values is automatically followed by operation of the indexing mechanism so that the camera is ready to make the next exposure with flash as soon as an exposure with flash has been completed and without necessitating any attention on the part of the user.

An additional object of the invention is to provide a camera wherein the selection of one or more exposure values, the release of the shutter, and the operation of the indexing mechanism take place in a predetermined sequence and wherein the device which transmits motion to and triggers the operation of the indexing mechanism also forms part of the flash circuit to insure that the flash circuit is completed when the shutter is open.

Still another object of the invention is to provide a device for operating the indexing mechanism of a flash unit which is detachably coupled with a photographic camera and to construct and assemble the device in such a way that it occupies very little room, that it cannot be operated when the flash unit is improperly connected with the housing of the camera, that it can compensate for eventual inaccuracies in the dimensioning or machining of the flash unit, and that it can operate or initiate the operation of several types of indexing mechanisms.

Briefly stated, one feature of my invention resides in the provision of a camera which comprises a housing, a shutter mounted in the housing, a flash unit having a casing coupled to the housing, an indexible socket in the casing, the socket being adapted to support and rotate a "Flashcube" or an analogous multiple flash bulb holder in a predetermined direction, and indexing means provided in the casing and operative to rotate the socket through angles of predetermined magnitude, shutter actuating means mounted on the housing and movable (preferably by hand) from an idle position through first and second intermediate positions and to a second or end position, and motion transmitting means for operating the indexing means in response to movement of the actuating means to second position.

The actuating means may release the shutter in its second intermediate position. The housing of the camera preferably accommodates an automatic exposure control which can select one or more exposure values (e.g., the exposure time and/or the size of the diaphragm aperture) and is arranged to select such exposure value or values in response to movement of the actuating means from idle position to the first intermediate position.

The motion transmitting means may comprise a pair of cooperating posts or shafts which are respectively reciprocable in the housing and in the casing of the flash unit. One of these posts will be displayed by the actuating means and will shift the other post which then enables the indexing means to change the angular position of the socket in order to place a fresh flash bulb into an optimum position for illumination of the subject.

The novel features which are considered as characteristic of the invention are set forth in particular in the appended claims. The improved camera itself, however, both as to its construction and its mode of operation, together with additional features and advantages thereof, will be best understood upon perusal of the following detailed description of certain specific embodiments with reference to the accompanying drawings, in which:

FIG. 1 is a front elevational view of a still camera which embodies my invention, portions of the flash unit and camera housing being shown in section;

FIG. 2 is a horizontal section through the casing of the flash unit substantially as seen in the direction of arrows from the line II—II of FIG. 1; and FIG. 3 is a fragmentary front elevational view of a modified camera with the housing shown partly in vertical section.

FIG. 1 illustrates the housing 1 of a still camera whose top wall is provided with a standard accessory shoe 2. This shoe can receive the foot 4 of a flash unit which comprises a casing 3 accommodating a rotary socket 12 for the foot 11 of a multiple flash bulb holder 6 here shown as a "Flashcube" having a transparent shell with four vertical sides and accommodating four flash bulbs 7 each located in front of a reflector 8. The plug 11 extends downwardly from a disk-shaped base 9 consisting of insulating material and supporting four pairs of electric contacts 10, one pair for each flash bulb 7. The casing 3 further accommodates two stationary contacts (not shown) which will be engaged by one pair of contacts 10 when the respective flash bulb 7 faces the subject provided, of course, that the camera is held by the user in a position in which the objective 5 is also trained upon such subject. The fixed contacts of the casing 3 are connected in circuit with a customary synchronizing switch (not shown in FIG. 1) and the flash circuit is completed in response to manipulation of shutter actuating means including an actuating member 35 which is provided on a ring 36 turnable about the optical axis of the objective 5. The flash circuit comprises several electrical components including a battery 15 and a capacitor 16, both installed in the casing 3. The remaining electrical components of the flash circuit are mounted in the housing 1 and include the aforementioned synchronizing switch.

When the user has completed an exposure with flash, the socket 12 must be indexed through 90 degrees in a predetermined direction in order to place a fresh flash bulb 7 into an optimum position for illumination of the subject. In response to such rotation through 90 degrees, the aforementioned fixed contacts are engaged by the next pair of contacts 10 to connect the fresh bulb 7 into the flash circuit.

One type of indexing mechanism for the socket 12 is illustrated in FIG. 2 and comprises a spring motor including a torsion spring 25 one end of which is fixed to the casing 3. The other end of this spring is secured to the socket 12 and the spring 25 will store energy in response to rotation of the holder 6 after the plug 11 has been properly inserted into and coupled with the socket. The holder 6 will be rotated in a clockwise direction through 360 degrees or more. The spring 25 is coaxial with the socket 12 which latter carries four equidistant projections in the form of pins 26 one of which is normally engaged by the pallet 50 of a catch here shown as a two-armed lever 28 fulcrumed at 27 and biased by a helical return spring 29 so that its left-hand arm normally abuts against a stop pin 30. The spring 25 will be free to dissipate energy and to index the socket 12 in response to turning of the actuating member 35 from the idle position shown in FIG. 1 to a second position. The ring 36 carries a projection or arm 37 (see FIG. 1) which can displace a first motion transmitting post 38 reciprocably mounted in a guide sleeve 1a of an internal partition 1b forming part of the housing 1. The upper engaging end portion of the post 38 is slidably guided in a vertical sleeve 40 of the shoe 2 and is normally held in the illustrated idle position by a leaf spring 39 mounted on the partition 1b and extending into a spool 38a affixed to a median portion of the post 38 between the partition 1b and shoe 2. In such idle position, the upper end face of the post 38 is flush with or at a level below the internal bottom surface of the shoe 2 so as not to interfere with insertion of the foot 4.

The casing 3 accommodates a second vertically reciprocable motion transmitting post 41 which is biased downwardly by a helical spring 42 and carries a radially extending arm 43 for a disengaging member or follower 44 adapted to rock the lever 28. The arm 43 normally bears against the top face of the foot 4 so that the lower engaging end portion of the post 41 cannot extend beyond the underside of the foot 4 and does not interfere with insertion of the foot into the shoe 2. The right-hand arm of the lever 28 (as viewed in FIG. 2) carries a cam plate 45 which can be engaged and displaced by the follower 44 when the post 41 is moved upwardly against the opposition of the spring 42. The cam plate 45 then rocks the lever 28 in a clockwise direction, as viewed in FIG. 2, whereby the pallet 50 moves away from the adjoining pin 26 and the spring 25 is free to unwind and to index the socket 12 and holder 6 through 90 degrees. If the actuating member 35 is released immediately after the pallet 50 has moved away from the adjacent pin 26 of the socket 12, the spring 29 returns the pallet into the pathway of the next-following pin 26 before the socket 12 has been turned through 90 degrees so that the socket is automatically arrested after having completed exactly one-fourth of a full revolution which is necessary in order to place a fresh flash bulb 7 into an optimum position for firing during the next exposure. The flash unit of the present invention comprises a safety device for automatically arresting the socket 12 even if the actuating member 35 is held in depressed position long enough to allow for travel of the next pin 26 beyond the pallet 50. Such safety device is constituted by a stop plate 49 mounted on the right-hand arm of the lever 28 and extending into the pathway of the pin 26' when the lever has been rocked through the intermediary of the follower 44 so that its pallet 50 allows the socket 12 to rotate. The stop plate 49 will arrest the socket 12 after the latter has completed a little less than full 90 degrees but such position of the socket is only temporary because the spring 29 contracts in response to disengagement of the follower 44 from the cam plate 45 whereby the pallet 50 returns to the position shown in FIG. 2 and arrests the socket 12 after the latter has been turned through a small angle in response to movement of the stop plate 49 away from the pin 26'.

The housing 1 of the still camera accommodates a conventional built-in exposure control 51 which includes a light-sensitive element and can select the size of the diaphragm aperture as a function of the intensity of light coming from the subject. The exposure control 51 is normally held in locked position by the actuating member 35 which abuts against a pin 52 mounted on a vertically reciprocable rod 53 biased by a spring 54. The rod 53 trails the actuating member 35 when the latter is turned in a counterclockwise direction (arrow 46) and this rod then adjusts the diaphragm as a function of light intensity in a manner well known from the art and forming no part of the present invention. The rod 53 preferably also adjusts the shutter which is represented by a release trigger 55. A motion transmitting stud 56 of the ring 36 will actuate the trigger 55 to release the shutter after the exposure values (size of the diaphragm aperture and/or the exposure time) have been properly selected by the control 51. This opens the shutter so that the camera can make an exposure. The arm 37 of the ring 36 will shift the post 38 (and hence the post 41) upwardly, as viewed in FIG. 1, after the camera has completed an exposure with flash. Such exposure will be made because the ring 36 or one of its parts 35, 37 closes the synchronizing switch not earlier than at the time the trigger 55 releases the shutter.

As the engaging end portions of the posts 38, 41 move upwardly, the follower 44 rocks the cam plate 45 whereby the lever 28 moves its pallet 50 away from the adjoining pin 26 and the spring 25 is free to index the socket 12 and the holder 6 in a manner as described above. In order to make sure that the holder 6 will be indexed through exactly 90 degrees, the flash unit may comprise one or more detent devices which will hold the socket 12 against further rotation after the holder 6 has been indexed through one-fourth of a full revolution. A suitable detent device will comprise a spring-biased ball which is mounted in the casing 3 and snaps into one of four equidistant notches in the peripheral surface of the socket 12 after the socket has been indexed through 90 degrees. Two or more spring-biased balls may be used if desired.

When moved from the illustrated idle position, the actuating member 35 will first assume a first intermediate position in which the exposure control 51 is free to select one or more exposure values, thereupon a second intermediate position in which the stud 56 trips the trigger 55, and ultimately reaches its second or end position in which the follower 44 disengages the lever 28 from the socket 12 to permit operation of the indexing mechanism.

FIG. 3 shows a portion of a modified camera whose housing 1' is provided with a shoe 2' adapted to accommodate the foot 4 (not shown) of a flash unit corresponding to the flash unit of FIG. 1. In this embodiment of the present invention, the post 38 of FIGS. 1 and 2 is replaced by a post 38' consisting of conductive material and comprising two relatively movable telescopically connected tubular sections 38a', 38b' accommodating a helical expansion spring 48 which tends to move them apart to lengthen the post 38'. Thus, the post 38' can expand and contract to compensate for eventual inaccuracies in the mounting of the post 41' in the foot of the flash unit, in dimensioning of the shoe 2' and/or in dimensioning of the flash unit. This post 38' serves as a center contact and its lower section 38a' is connected with a conductor 57 connected to one terminal of the synchronizing switch. The post 41' in the casing of the flash unit whose foot is properly accommodated in the shoe 2' is connected to the battery 15 by a conductor 58, and the battery may be connected with the other terminal of the synchronizing switch. Such parts of the housing 1' which come in contact with the post 38' consist of insulating material and the foot of the flash unit including the post 41' shown in FIG. 3 also consists at least in part of insulating material which surrounds the post 41'.

The exposure control 51 (not shown in FIG. 3), the shutter and the diaphragm can be constructed in the same way as shown in and described in connection with FIG. 1. When the actuating member 35 is turned in a counterclockwise direction, the exposure control will select the exposure values and the stud 56 of the ring 36 then trips the trigger 55 to open the shutter. Such opening of the shutter will take place when the synchronizing switch is closed and when the arm 37 has lifted the post 38' sufficiently to move the upper tubular section 38b' into abutment with the post 41' to thus complete the flash circuit. The synchronizing switch is preferably closed by the trigger 55 or by the shutter proper in a manner well known from the art. After the shutter has been closed again, and in response to further counterclockwise rotation of the ring 36, the arm 37 moves the post 38' upwardly to such an extent that the post 41' disengages the lever 28 in a manner as described in connection with FIG. 2 to enable the spring 25 to index the socket 12 and holder 6 through 90 degrees. The spring 42 of the flash unit which is used in connection with the camera of FIG. 3 must consist of insulating material unless such spring is used to replace the conductor 58 and to connect the post 41' with the battery 15.

It might be advisable to provide the ring 36 with an arcuate arm 37 which is better suited to effect displacement of the post 38' to the extent necessary to disengage the lever 28.

As stated before, the spring motor including the spring 25 constitutes but one of several indexing mechanisms which can be utilized in the camera of the present invention. For example, the indexing mechanism may comprise an electromagnet which replaces the lever 28 and releases the socket 12 to rotate in response to the bias of the spring 25 when the post 38' of FIG. 3 engages the post 41'. Also, the entire indexing mechanism may be constituted by an electromagnet which can rotate the socket 12 through angles of desired magnitude. Such electromagnet may be energized in response to engagement of posts 38', 41' or in response to actuation of a suitable cable release connected with the housing 1 or 1' and serving to release the shutter in place of the actuating means 35–37. The actuating member 35 may be mounted on another part of the housing 1 or 1' and can transmit motion to the post 38 or 38' through a link train, slide, system of levers, or the like. The battery 15, capacitor 16 and/or other components of the flash circuit may be installed in the housing 1 or 1' and the automatic exposure control may be omitted if the camera is provided with manually operated means for selecting the exposure values. The flash unit can be coupled with the housing 1 or 1' by means of a suitable adapter whose foot is receivable in the shoe 2 or 2'.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is:

1. In a camera, a housing; a flash unit including a rotary indexible socket adapted to support and rotate a multiple flash bulb holder in a predetermined direction, indexing means operative to rotate said socket through angles of preselected magnitude, and a casing detachably carried by said housing and accommodating said socket and said indexing means; camera actuating means mounted on said housing and movable from a first position to a second position; motion transmitting means for operating said indexing means in response to movement of said actuating means to second position, said motion transmitting means comprising a first motion transmitting member movably mounted in said housing and being displaced in response to movement of said actuating means to second position, and a second motion transmitting member movably mounted in said casing and engaging means including a first engaging portion on said first motion transmitting member and a second engaging portion on said second motion transmitting member, said first and second engaging portions being in motion transmitting engagement when the said casing is carried by said housing so as to operate said indexing means in response to displacement of said first motion transmitting member.

2. A structure as set forth in claim 1 wherein, during movement to said second position, said actuating means assumes first and second intermediate positions, and further comprising a shutter which is installed in said housing and is released in response to movement of said actuating means to said second intermediate position, and an exposure control provided in said housing and arranged to select at least one exposure value in response to movement of said actuating means to said first intermediate position.

3. A structure as set forth in claim 1, wherein said indexing means comprises electromagnet means energizable by said motion transmitting means in response to movement of said actuating means to second position.

4. A structure as set forth in claim 1, wherein said actuating means comprises a cable release.

5. A structure as set forth in claim 1, wherein said actuating means comprises a ring rotatable about the optical axis of the camera, a manually operable member for turning said ring, and an arm connected with said ring and positioned to displace said first motion transmitting member in response to manual operation of said manually operable member.

6. In a camera, a housing comprising an accessory shoe; a shutter in said housing; a flash unit including a rotary indexible socket adapted to support and rotate a multiple flash bulb holder in a predetermined direction, indexing means operative to rotate said socket through angles of preselected magnitude; and a casing accommodating said socket and said indexing means and comprising a foot extending into said shoe to couple the casing to said housing; camera actuating means mounted on said housing and movable from an idle position to a second position; and motion transmitting means for operating said indexing means in response to movement of said actuating means to second position, said motion transmitting means comprising a first motion transmitting member movably mounted in said housing and extending into said shoe in response to movement of said actuating means to second position, and a second motion transmitting member movably mounted in said foot and arranged to operate said indexing means in response to movement of said first motion transmitting member into said shoe.

7. A structure as set forth in claim 6, wherein said first motion transmitting member is a post which is reciprocable in said housing.

8. A structure as set forth in claim 7, further comprising a flash circuit including first and second electrical components respectively installed in said housing and said casing, said post consisting of current conducting material and being arranged to electrically connect said first and second components in response to movement of said actuating means from idle position.

9. A structure as set forth in claim 8, wherein said post is arranged to connect said first and second electrical components before the actuating means assumes said second position.

10. A structure as set forth in claim 7, wherein said post is of variable length.

11. A structure as set forth in claim 10, wherein said post comprises a tubular section, a second section telescoped into and slidable relative to said first section, and resilient means for biasing said sections in directions to lengthen said post.

12. A structure as set forth in claim 6, wherein said indexing means comprises a spring motor including a spring coupled to said socket and said casing and arranged to store energy in response to rotation of said socket counter to said predetermined direction, catch means for normally holding said socket against rotation in said predetermined direction, and a disengaging member movable by said motion transmitting means to disengage said catch means from said socket in response to movement of said actuating means to second position.

13. A structure as set forth in claim 6, wherein said indexing means is arranged to rotate said socket through angles of 90 degrees.

14. A structure as set forth in claim 6, wherein said actuating means comprises a member rotatable about the optical axis of the camera and said motion transmitting means comprises a pair of registering posts respectively reciprocable in said housing and said casing and movable axially in one direction in response to movement of said actuating means to second position, and resilient means for biasing said posts in the opposite direction.

15. In a camera, a housing; a shutter in said housing; a flash unit including a rotary indexible socket adapted to support and rotate a multiple flash bulb holder in a predetermined direction, indexing means operative to rotate said socket through angles of preselected magnitude, and a casing accommodating said indexing means and said socket and being detachably coupled to said housing; camera actuating means mounted on said housing and movable from an idle position to a second position; and motion transmitting means for operating said indexing means in response to movement of said actuating means to second position, said motion transmitting means comprising registering posts respectively provided in said housing and said casing and resilient means for biasing said posts in a direction counter to that in which said posts are moved in response to movement of said actuating means to second position.

References Cited

UNITED STATES PATENTS

| | | | |
|---|---|---|---|
| 2,555,495 | 6/1951 | Langdon | 95—11.5 |
| 3,318,214 | 5/1967 | Singer et al. | 95—10 |
| 3,353,465 | 11/1967 | Peterson et al. | 95—11.5 |
| 3,353,467 | 11/1967 | Ernisse et al. | 95—11.5 |
| 3,357,329 | 12/1967 | Nerwin | 95—11 |

FOREIGN PATENTS 848,012  9/1952  Germany.

NORTON ANSHER, *Primary Examiner.*

FRED L. BRAUN, *Assistant Examiner.*

U.S. Cl. X.R.

240—1.3, 37.1